United States Patent
Kallin (10) Patent No.: US 6,860,423 B2
(45) Date of Patent: Mar. 1, 2005

(54) SERIALIZED SYSTEM FOR IMAGE REPLACEMENT DOCUMENTS

(75) Inventor: Fredrik L. N. Kallin, Waterloo (CA)

(73) Assignee: NCR Corporation, Dayton, OH (US)

( * ) Notice: Subject to any disclaimer, the term of this patent is extended or adjusted under 35 U.S.C. 154(b) by 32 days.

(21) Appl. No.: 10/325,341

(22) Filed: Dec. 19, 2002

(65) Prior Publication Data

US 2004/0118909 A1 Jun. 24, 2004

(51) Int. Cl.[7] .................................................. G06K 5/00
(52) U.S. Cl. .................................... 235/380; 235/382.5
(58) Field of Search .............................. 235/380, 382.5, 235/375, 379, 381, 383, 472.01, 382

(56) References Cited

U.S. PATENT DOCUMENTS

| | | | | |
|---|---|---|---|---|
| 5,636,294 A | * | 6/1997 | Grosse et al. | 382/239 |
| 5,677,955 A | * | 10/1997 | Doggett et al. | 705/76 |
| 6,021,202 A | * | 2/2000 | Anderson et al. | 705/54 |
| 6,125,349 A | * | 9/2000 | Maher | 705/1 |
| 6,209,095 B1 | * | 3/2001 | Anderson et al. | 713/176 |
| 6,408,330 B1 | * | 6/2002 | DeLaHuerga | 709/217 |
| 6,564,996 B2 | * | 5/2003 | Hoffman et al. | 235/379 |
| 6,609,200 B2 | * | 8/2003 | Anderson et al. | 713/176 |

* cited by examiner

*Primary Examiner*—Thien M. Le
(74) *Attorney, Agent, or Firm*—Gregory A. Welte

(57) ABSTRACT

An improved process for clearing bank checks. Paper bank checks are digitized, and the paper checks are placed into storage. The digitized versions are used in the check-clearing process. When paper versions of the checks are required, as when a check is needed for evidence in a lawsuit, a paper version is printed from the corresponding digitized version, each paper version bearing a unique serial number, wherein no two serial numbers are alike. At that time, selected data from the printed check is stored in a database. A recipient of the printed check is allowed access to the database, to verify authenticity of the printed check.

14 Claims, 11 Drawing Sheets

PRIOR ART

SERIALIZED SYSTEM FOR IMAGE REPLACEMENT DOCUMENTS

BACKGROUND OF THE INVENTION

The invention concerns a clearing system for bank checks, wherein electronic versions of the checks, rather than the checks themselves, are transferred among banks. When paper versions are required, they are printed on-demand from the electronic versions. The paper versions are called Image Replacement Documents, IRDs. The invention provides an approach for preventing fraud or mistake in connection with the IRDs, as could occur if a given IRD were printed multiple times. Multiple printings are not desired, because the IRDs are negotiable instruments.

BACKGROUND OF THE INVENTION

Figure 1:
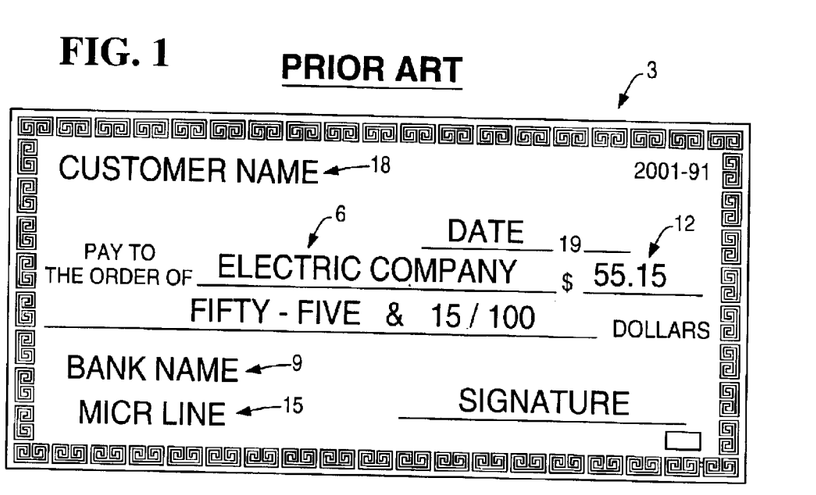
FIG. 1 illustrates some components of a bank check 3.

Paper bank checks are in widespread use. FIG. 1 illustrates a typical bank check 3. After the payee 6 receives the check 3, the payee 6 will take steps by which the check 3 enters a check-clearing system, which in the United States is operated by the Federal Reserve System.

A special case would occur if the check 3 is presented to the bank 9 on which the check is drawn. In that case, the drawee-bank 9 would simply (1) deduct the amount 12 of the check 3 from the account of the drawer 18, the account number being contained in the MICR line 15, (2) pay the payee 6, (3) retain the check 3 rather than entering it into the clearing system, and (4) perhaps later deliver the check 3 to the drawer 18 in a monthly statement.

But, in the general case, the check 3 will enter the check-clearing system. The check-clearing system performs several functions. One is that it sorts all the checks according to drawee-bank, and delivers the checks to the respective drawee-banks.

A second is that it handles money transfers, so that all banks involved are properly charged and credited. For example, if the payee 6 of the check 3 in FIG. 1 deposits the check 3 in the payee's own bank, that bank will give a provisional credit to the payee's account. That bank is called the bank-of-first-deposit, BOFD.

The BOFD then enters the check 3 into the check-clearing system, wherein (1) the physical check is transferred to the drawee-bank 9, (2) a charge is levied against the drawee-bank 9 in the amount 12 of the check, and (3) a credit is issued to the BOFD in that amount.

The check-clearing system performs additional functions, which will not be described in detail, but briefly mentioned. It handles issues arising when the drawee bank 9 rejects the check 3, as can occur if the account 15 lacks funds to pay the check 3, or if the account 15 has been closed.

It also assures the credit-worthiness of the banks involved, thereby minimizing the possibility that a bank will become insolvent during the check-clearing process, and thereby default on a charge which has been levied against it.

It also sets up procedural rules, such as specifying the time limit within which a drawee-bank must reject a check drawn on an account lacking funds. If the limit expires, the drawee-bank is deemed to have accepted the check.

Therefore, the check-clearing system can be viewed as performing three primary types of function. One is that it sorts and distributes the paper checks to the drawee-banks. A second is that it transfers money among the banks to settle accounts. The third type of function can be viewed as a collection of administrative procedures which enable the clearing system to accomplish the first and second functions in a practical manner. The particular methods in which the functions outlined above are presently implemented have evolved for historical reasons, primarily because the checks used always have been paper-based. With the development of modern electronics and high-speed digital computers, it may be possible to eliminate some of the steps required in a paper-based check clearing system, to thereby streamline the check-clearing process.

OBJECTS OF THE INVENTION

An object of the invention is to provide an improved check-clearing system.

SUMMARY OF THE INVENTION

In one form of the invention, paper bank checks are digitized into digital images during, or prior to, the check-clearing process, and the paper checks are placed into storage. The check-clearing is then accomplished using the digital images.

Sometimes, paper versions of the checks are required. Paper versions are then printed based on the digital images. To prevent fraud and mistake, each paper version is assigned a unique serial number. That serial number, together with information contained on the check, is stored in a central database. The database is made available to holders of the paper versions, to verify authenticity.

DETAILED DESCRIPTION OF THE INVENTION

Figure 2:
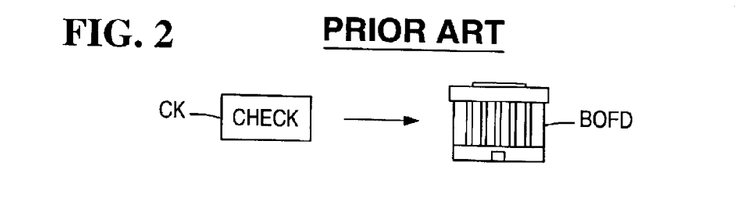
FIGS. 2–10 prior at form flow charts, in pictorial format, which illustrate processes undertaken by several forms of the invention.

FIGS. 2–10 collectively illustrate a flow chart, in pictorial forms, which describe processes undertaken in Electronic Check Presentment, ECP. In FIG. 2, a check CK is deposited into a Bank of First Deposit, BOFD. For example, the payee "ELECTRIC COMPANY" in FIG. 1 may deposit check 3 into an account which it maintains in the BOFD of FIG. 2.

Figure 3:
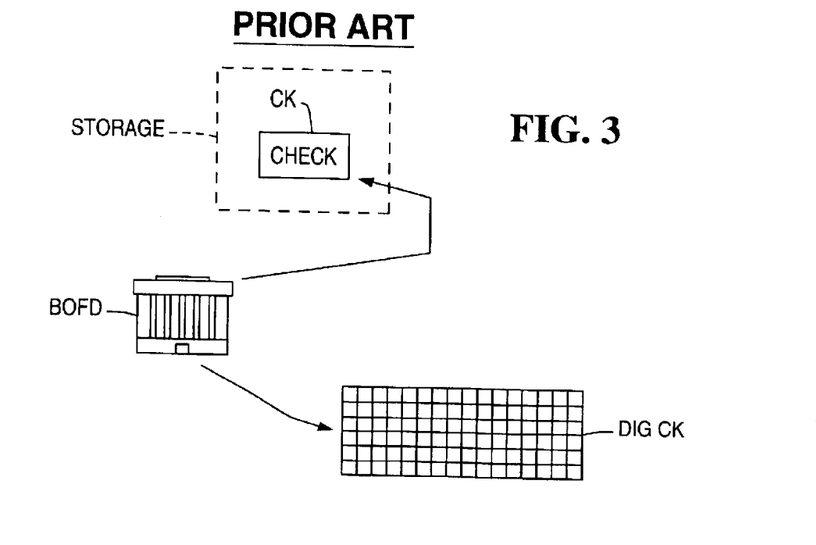

As indicated in FIG. 3, the BOFD generates a digitized image DIG CK of the check, and places the actual paper check CK into storage. Conceptually, the digitized image is a bitmap, possibly compressed. In general, any process by which the visual information on the check, front and back, can be (1) captured, (2) stored in a computer, and (3) transferred over communication links will suffice.

In addition, the BOFD may extract certain data from the check CK, such as the amount 12 in FIG. 1, the MICR data 15, etc., and store that data in a text file (not shown). The BOFD may keep the text file in association with, or linked to, the digitized check DIG CK. That is, the text file effectively will accompany the digitized check wherever the latter is transferred.

It is emphasized that the identity of the party who creates the digitized check DIG CK is not necessarily significant, but the important event is that the digital image DIG CK accurately represent the paper check.

Figure 4:
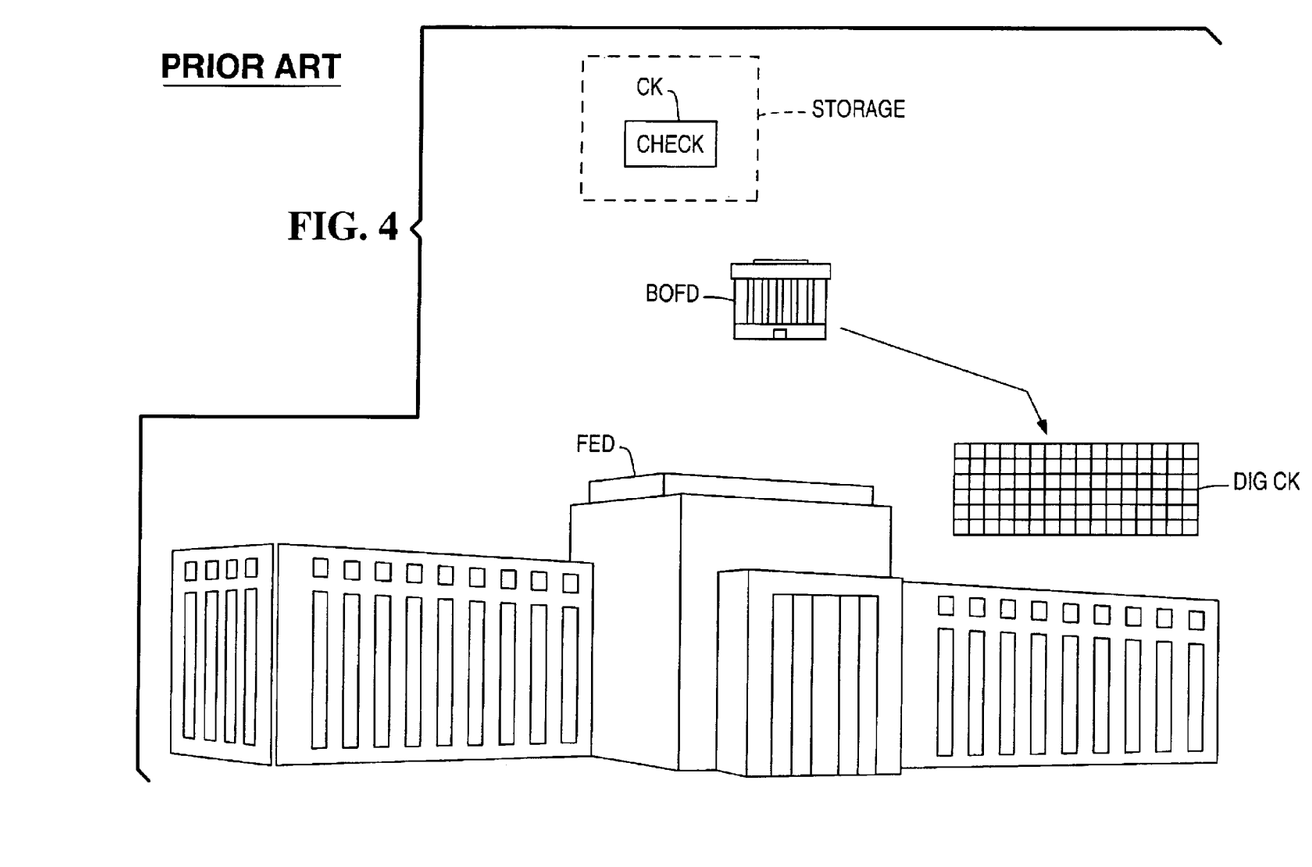
Figure 5:
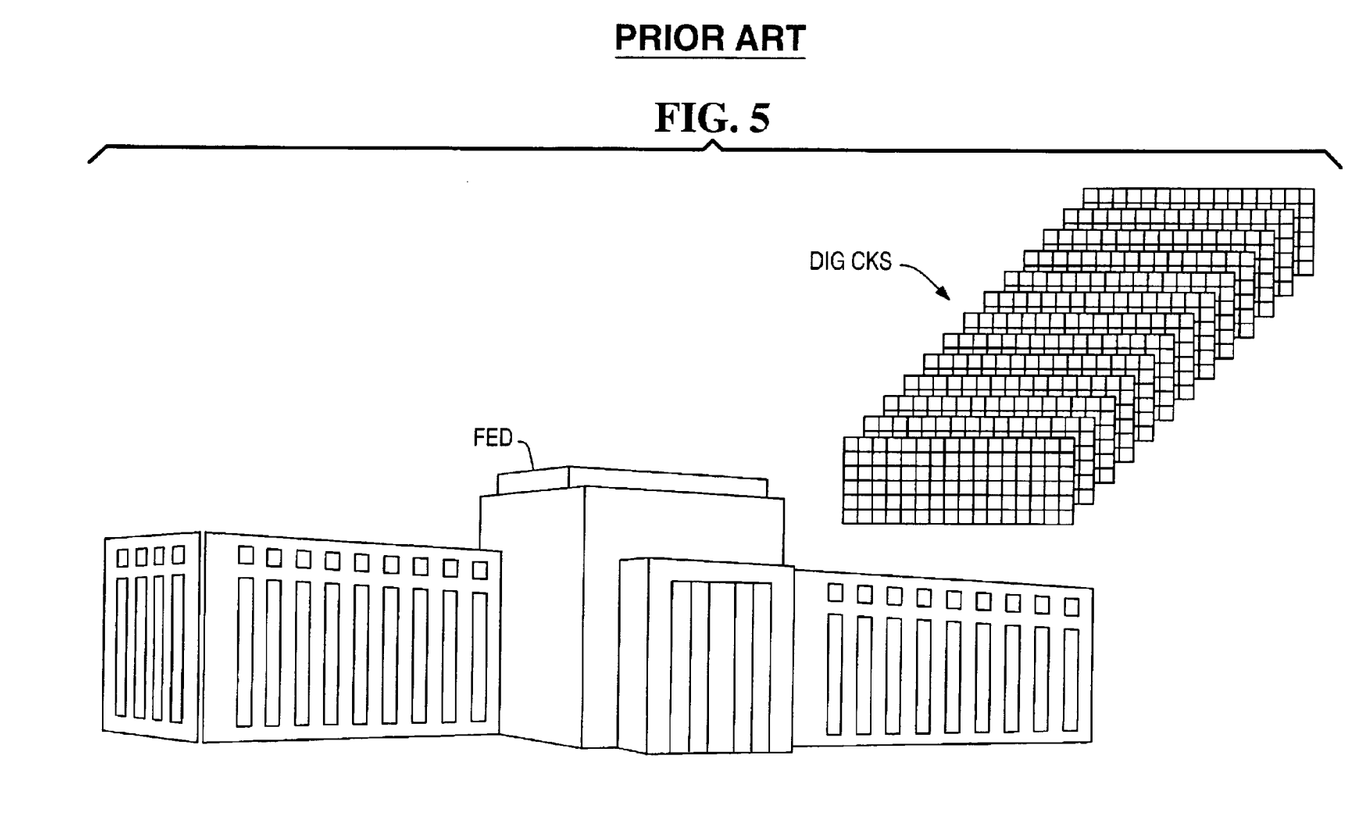

In FIG. 4, the BOFD transfers the digital image DIG CK to a check clearing system, which in the United States is handled by the Federal Reserve System, and is designated FED. The check clearing system receives millions of digital checks daily from numerous banks, and these are represented by the collection of digital checks DIG CKS in FIG. 5.

Figure 6:
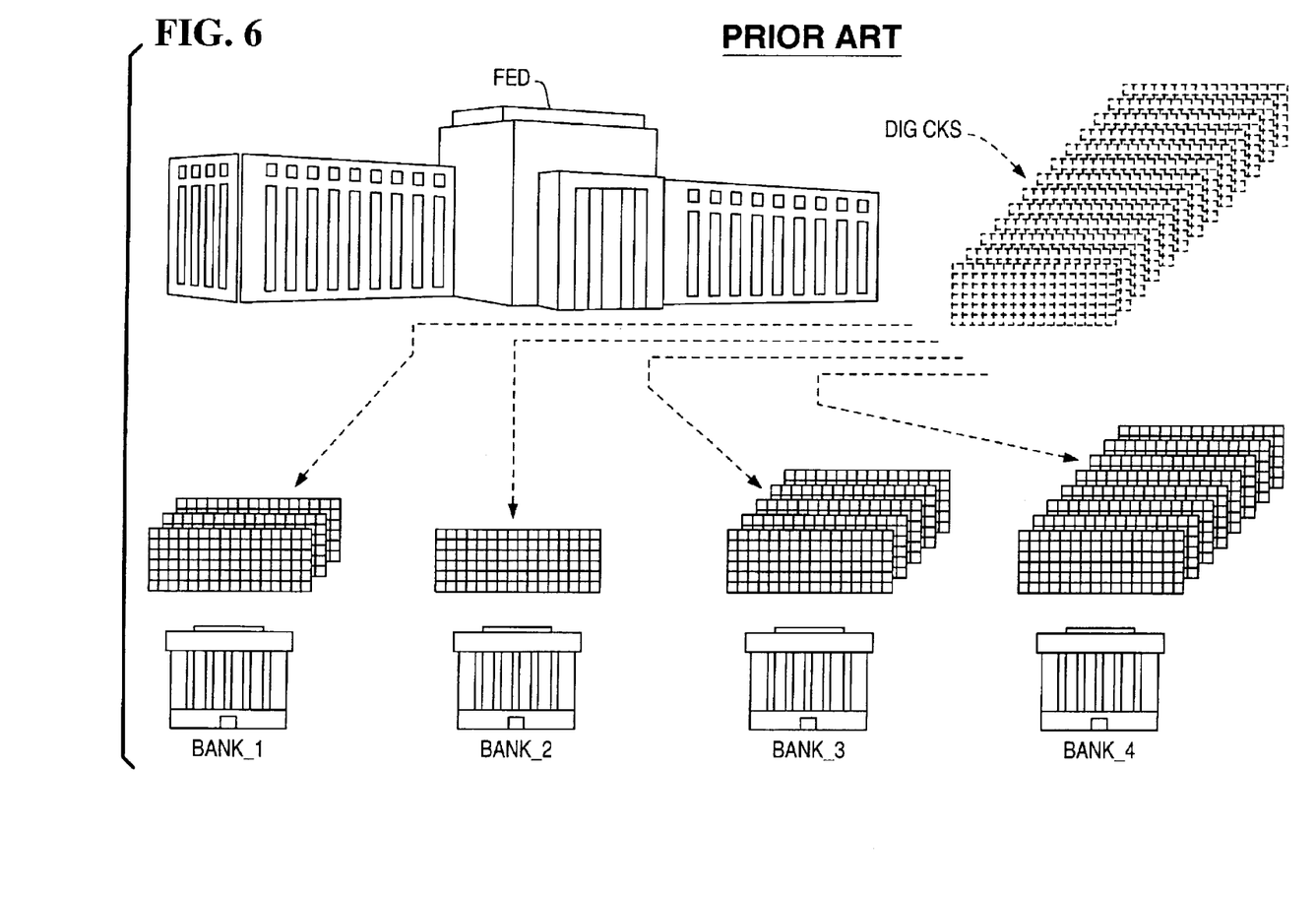

The clearing system distributes the digital checks DIG CKS to the banks on which they are drawn, as indicated in FIG. 6. Those banks use the digital checks, or the text file discussed above, or both, to balance the accounts on which the checks were drawn. In addition, the banks may use the digital checks DIG CKS to print paper images of the checks, which may be included in the monthly statements mailed to the banks' customers.

However, not all the banks will necessarily be able to handle digital checks, particularly in the initial phases of implementation of an Electronic Check Presentment system. Some will require paper checks, as have been used traditionally. Thus, assume that BANK_3 in FIG. 7 lacks this digital capability, and will need standard paper-based checks.

Figure 7:
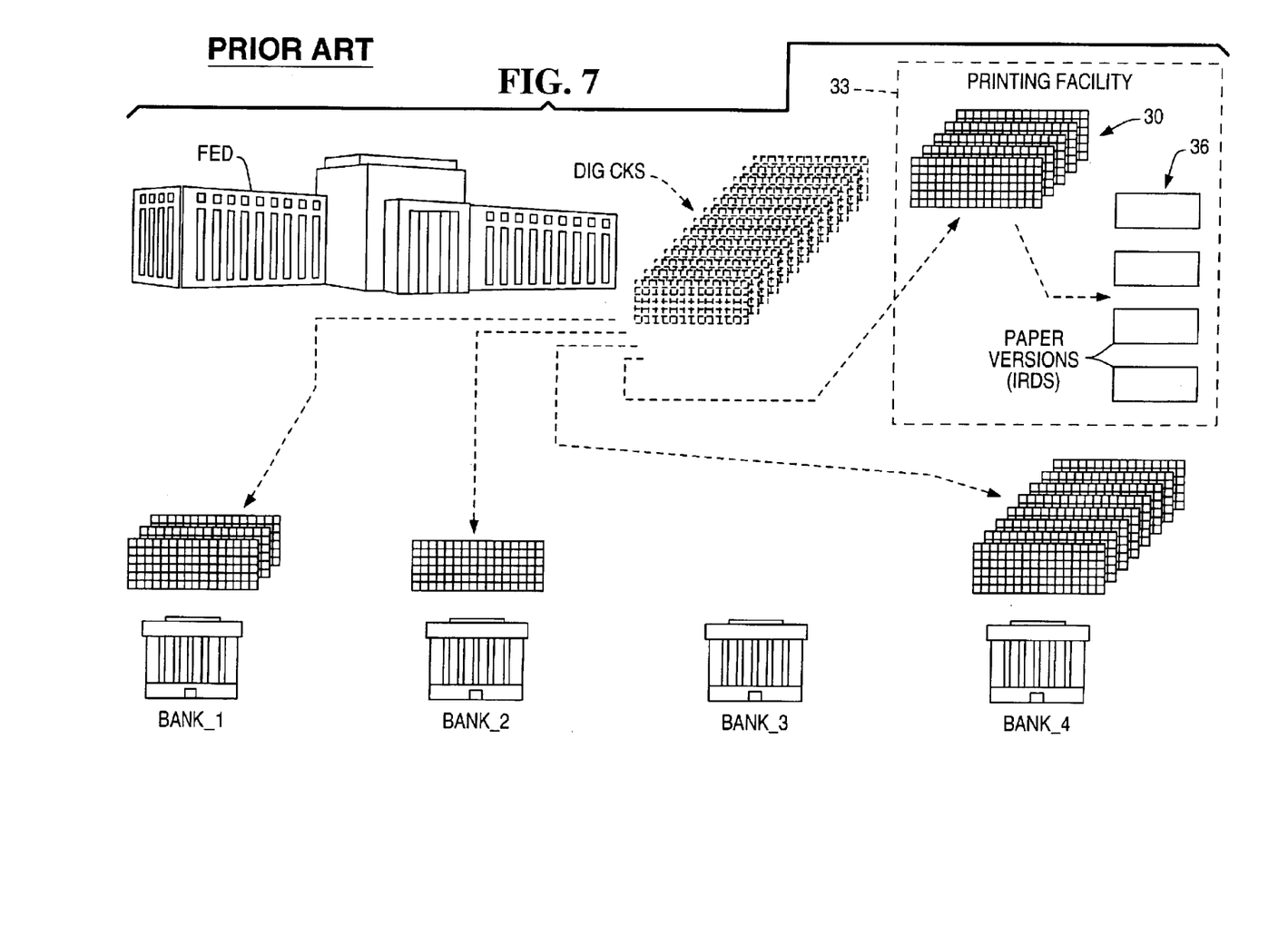

Accordingly, the clearing system FED delivers the digital images 30, representing the checks drawn on BANK_3, to a printing facility 33. The printing facility 33 generates paper representations 36 of the checks, called IRDs, Image Replacement Documents.

The Inventor points out that now two paper versions of the checks for BANK_3 exist. One version lies in the original paper checks, check CK in FIG. 3 representing one such paper check. In the example of BANK_3, four IRDs 36 are shown in FIG. 7, so four corresponding original paper checks will exist somewhere in a storage facility. The second paper versions in existence are, of course, represented by the newly printed IRDs 36 in FIG. 7.

Figure 8:
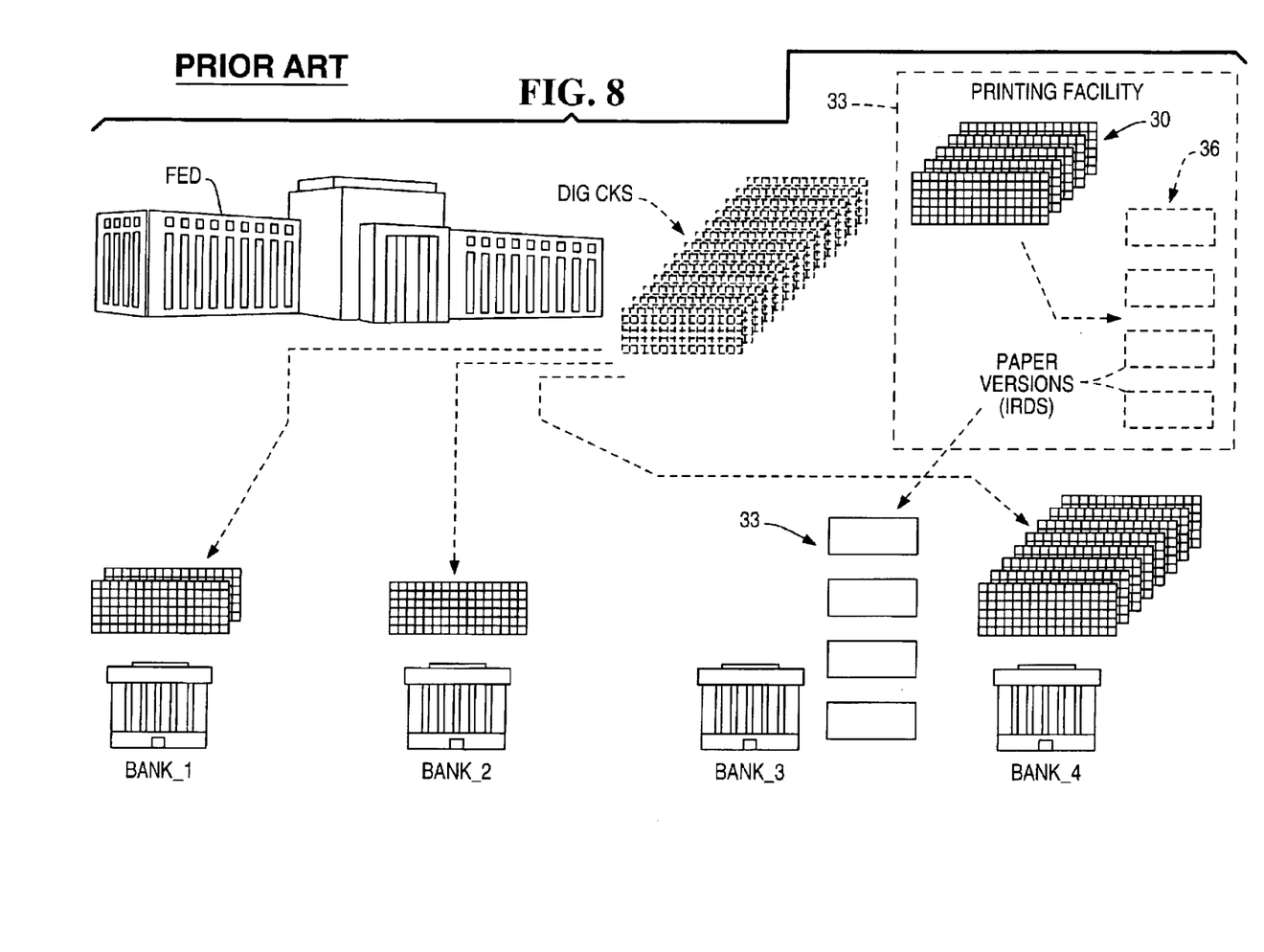

The IRDs 36, that is, the paper versions of the checks, are delivered to BANK_3, as in FIG. 8. The existing paper-based routing system can accomplish this delivery.

Therefore, as so far described, the drawee-banks have all received either (1) digitized images of the checks drawn on them or (2) paper representations of the digitized images.

It was stated that a text file may be generated for each check, containing selected, or all, information in the check. Thus, three possible combinations arise in items delivered to the banks:

digitized checks, plus text file,
IRDs, plus text file,
IRDs, no text file.

The text file can simplify accounting at the drawee bank, by eliminating manual data entry.

It may happen that paper versions of the checks may need to be generated for other reasons. For example, assume in FIG. 9 that BANK_1 receives a digitized check drawn on an account lacking funds to pay the check. BANK_1 would thus return the digitized check 50 to the printing facility 33, or another agency, as indicated by arrow 52. The printing facility 33, or agency, would generate an IRD 55, and print "INSUFFICIENT FUNDS" on it.

The clearing system FED would deliver this IRD 55 to the BOFD initially receiving the corresponding paper check. That BOFD is assumed to be BANK_3 in FIG. 10.

Figure 10:
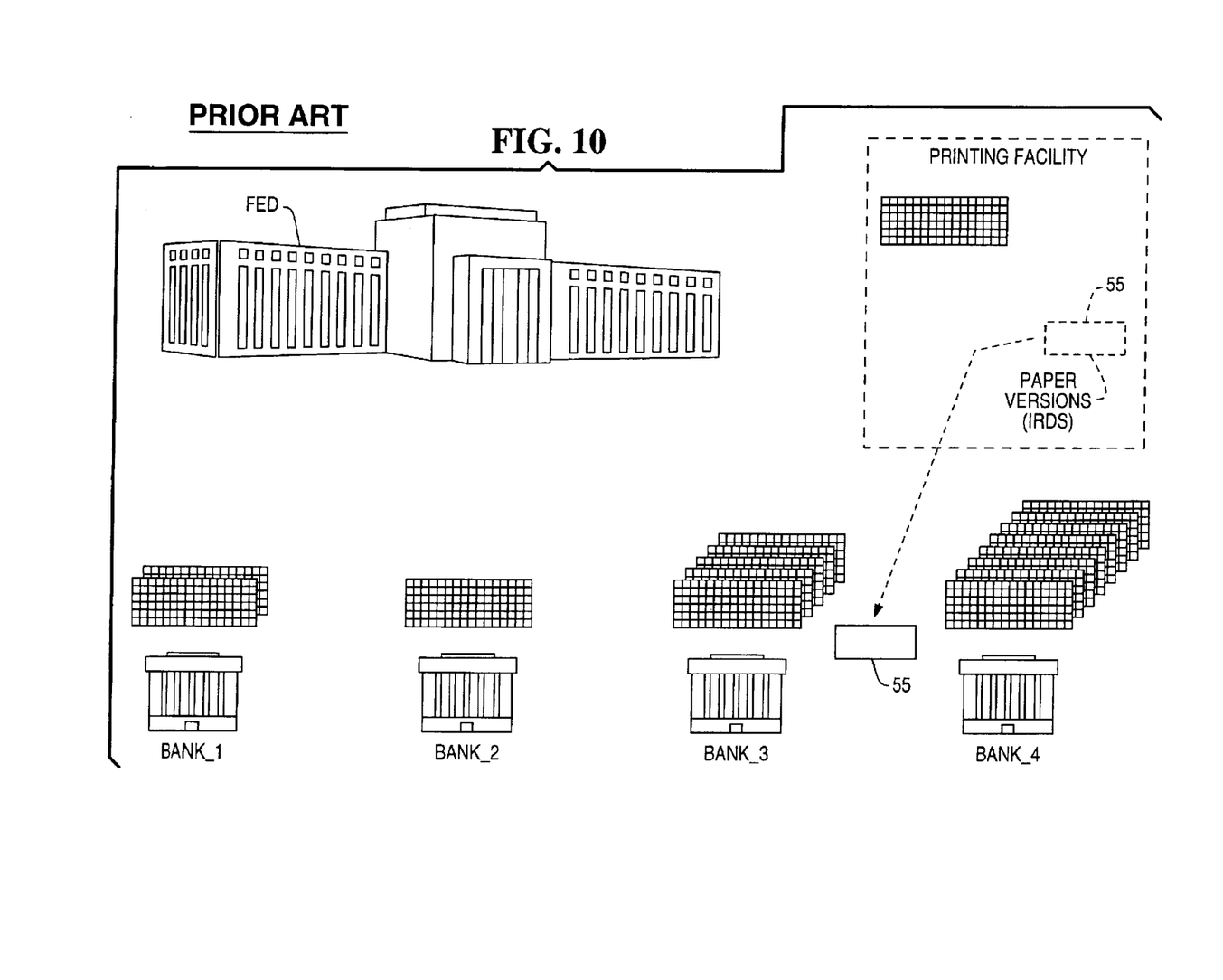

The BOFD would return that check to the depositor, thereby giving the depositor a paper check bearing a legend "INSUFFICIENT FUNDS," or equivalent. Such a document would be useful to the depositor in legal proceedings against the drawer of the check.

To repeat: BANK_3 initially received a bad paper check. That paper check was digitized, and placed into storage. The digitized version was submitted to the drawee-bank, rejected, and the system created an IRD 55, marked "INSUFFICIENT FUNDS," to replace the paper check. That IRD 55 was returned to BANK_3. The original paper check remained in storage.

Figure 9:
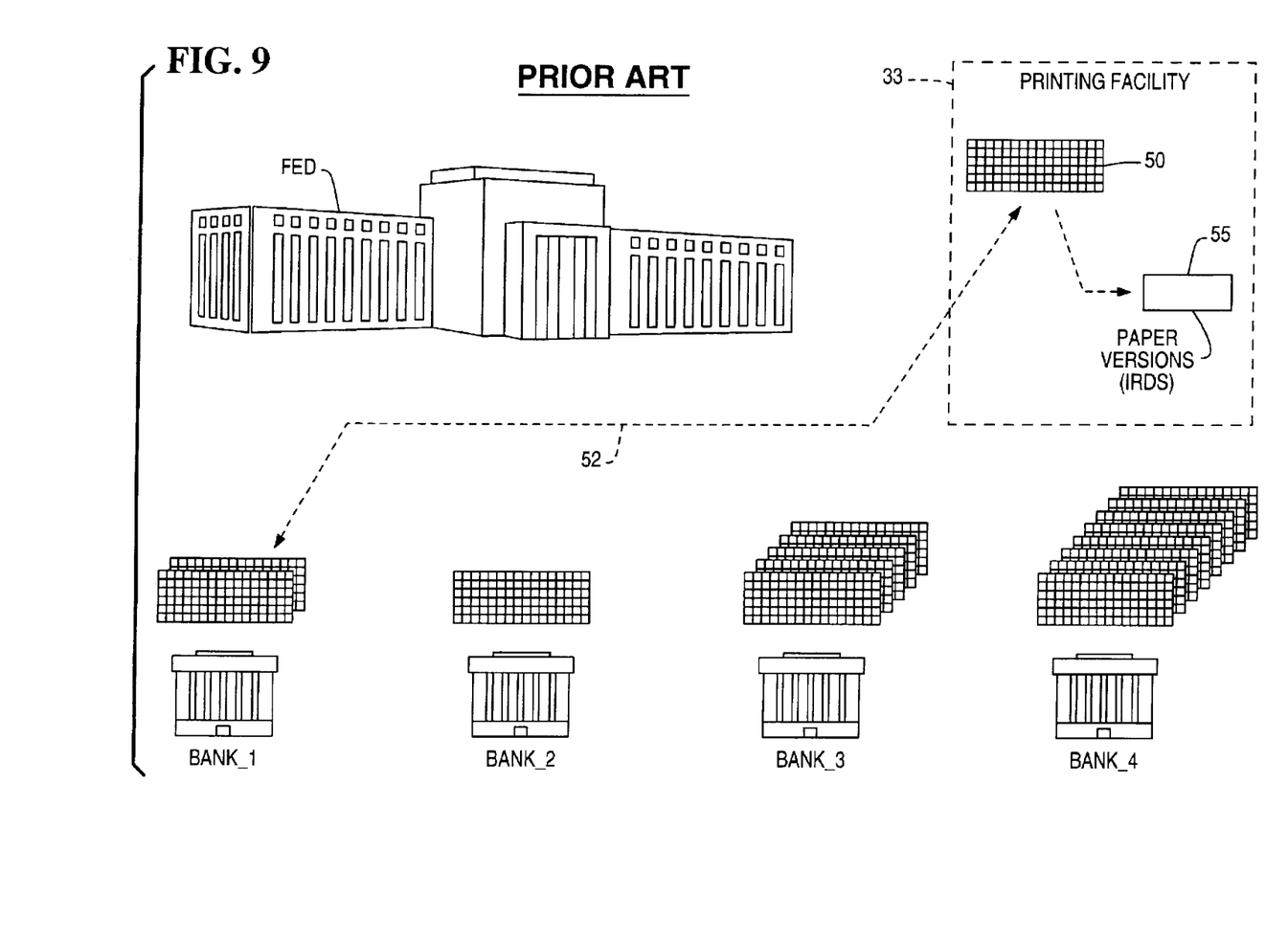

Other situations may arise when the printing described in connection with FIGS. 9 and 10 would occur. For example, a drawer may need a copy of a cancelled check because of a dispute over payment.

It is clear that, in the processes described above, a problem can arise because numerous identical IRDs could be generated from a single digital check, either through mistake or fraud. For example, when a check is returned due to insufficient funds in the checking account, an IRD is generated which is marked "INSUFFICIENT FUNDS." That IRD is eventually returned to the payee of the check. However, that IRD is still a valid negotiable instrument. For instance, under the Uniform Commercial Code, that IRD acts as a written promise, by the maker of the check, to pay the face amount of the check, to any valid holder. Further, if the holder is a "holder in due course," certain defenses to payment are not available to the maker of the check against the holder. Clearly, the maker of the check does not want multiple, apparently valid, copies of that instrument to exist.

Figure 11:
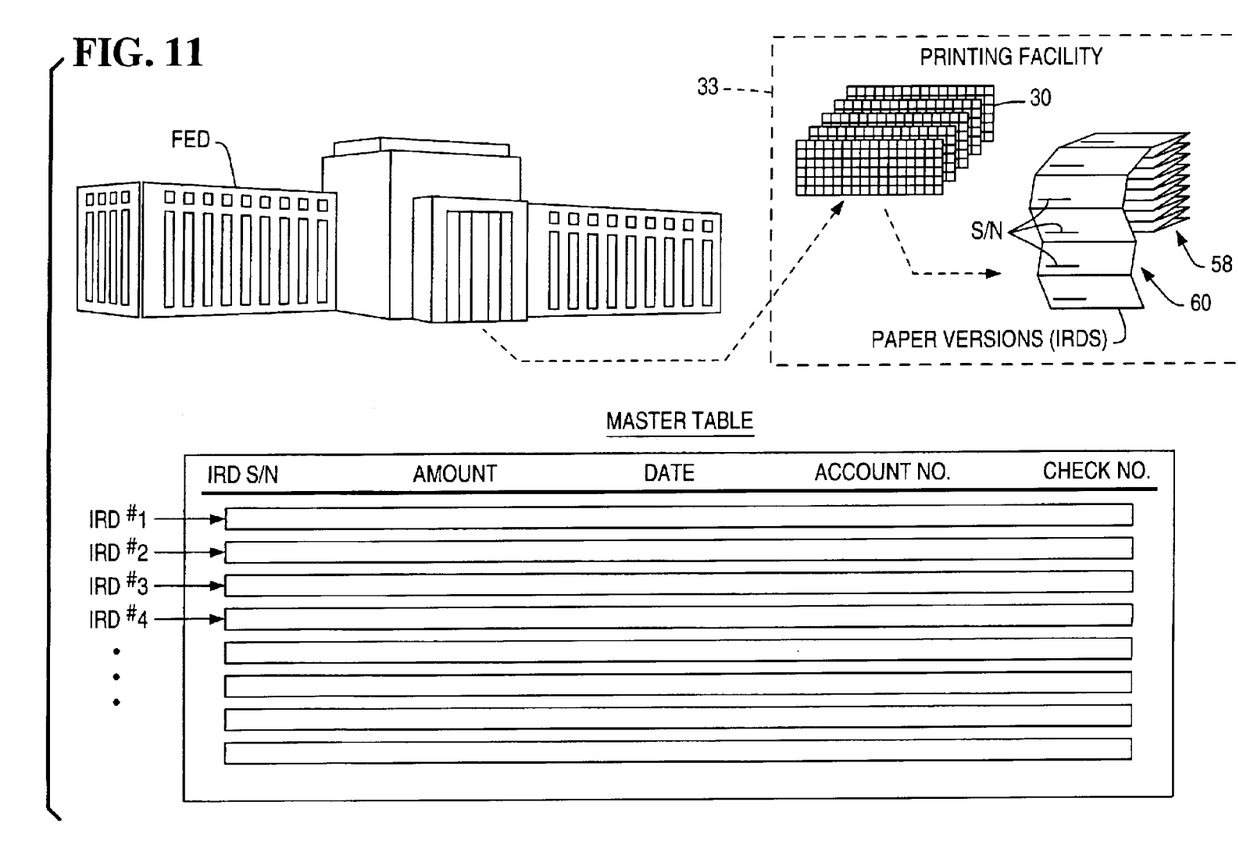
FIGS. 11–13 form flow charts, in pictorial format, which illustrate processes undertaken by several forms of the invention.

One form of the invention reduces, or eliminates, this problem. FIG. 11 illustrates procedures and apparatus which are added to a system of the general type just described. When the digital checks 30 are printed, they are printed onto paper stock 58 having pre-printed serial numbers S/N. Thus, the IRDs 60 are serialized.

In one form of the invention, the IRDs are printed onto ordinary paper, to thereby allow common printing equipment, such as computer laser printers, to be used. The paper may be fanfold type, as in FIG. 11, ordinary sheet paper, as used in laser printers, or another similar type.

The paper stock 58 may lack serial numbers, and the serial numbers would be generated by hardware and software which controls the printing process. Thus, as each IRD is being created, a serial number is assigned to it. Alternately, the IRD can be created on check stock bearing pre-printed serial numbers. In many countries, organizations which set technical standards have established commercial standards for check stock, that is, the paper on which bank checks are printed.

In either case (pre-printed serial numbers, or serial numbers printed in real-time), no two IRDs are printed having the same serial number. If the number of IRDs printed becomes so large that the serial numbers become excessively long, then the serial numbers can be re-initialized at a starting point. However, the need for re-initialization is seen as unlikely, as will now be explained.

Many credit cards in the U.S. have account numbers which are 16 decimal digits in length. A serial number of that length can represent numbers ranging from zero to 9,999,999,999,999,999, or essentially 10 quadrillion individual numbers. If 100 million checks were printed every day under the invention, then a different serial number could be printed on every check for 100 million days, without reaching 10 quadrillion. That is, 100-million-squared (or 108-squared) equals 10 quadrillion (or 1016).

As a rough estimate, 1,000 days are about equal to 3 years. Then 100 million days correspond roughly to 300,000 years. Therefore, a serial number containing 16 decimal digits is seen as adequate.

However, a larger limit on serial numbers can be accommodated by (1) increasing the number of digits, as by using hexadecimal numbers or alphanumeric digits instead of decimal digits, or (2) using a longer serial number, or both (1) and (2).

In any event, no two IRDs are printed having identical serial numbers.

Alternately, if a shorter serial number is used so that the serial numbers eventually run out, the run-out time is chosen so that no two IRDs exist in a common practical time frame. For example, if the run-out time is chosen as ten years, no two IRDs having identical serial numbers will exist in ten years. As a practical matter, two IRDs having the same serial number, but dated over ten years apart, as could occur in this system, are not seen as a basis for fraud or mistake which will cause injury.

Ten years was just discussed. However, in general, run-out times of any multiple of six months are contemplated, such as 6, 12, 18, 24, 30, 36 months, and so on.

Therefore, as just described, every IRD printed contains a different, or unique, serial number. Alternately, serial numbers may be exhausted, and restarted. If that is done, then the serial numbers contain enough digits so that, when re-start occurs, the possible dates of checks having identical serial numbers are so widely spaced that fraud is considered impossible.

In addition to serial printing of the IRDs, the invention maintains a master table 75 as in FIG. 11. That table 75 contains data relating to each check printed as an IRD (as opposed to all checks cleared). The data can be any combination of the following:

Initial check serial number,
Serial number assigned in printing step of FIG. 11,
Payee name,
Drawer name,
Account number,
Drawee bank name,
Drawee bank routing number,
Date of initial issuance, and
Date of printing IRD.

Table 75 can be maintained in the form of a relational database, which would simplify field-searching. For example, an authorized party could search all amount-fields, and find all IRDs drawn in a specific amount, such as $33.33.

Table 75 is made available to any parties having need-to-know of its contents, and that need is controlled by inter-bank agreements. Those parties include (1) the banks to which the paper IRDs are delivered and (2) parties who hold the paper IRDs.

Access to table 75 allows any party holding an IRD to verify whether that IRD is genuine. For example, the party would search table 75 using the serial number S/N in FIG. 11, printed on the check. The table 75 would then specify the relevant data contained on the check. Deviations would then indicate the check to be invalid, or suspect.

If the source of the IRD is considered trustworthy, the validation of the serial number and data printed on the check using table 75 provides conclusive evidence that the IRD is valid. For example, assume a purchaser of an automobile writes a check which is returned for insufficient funds in the account. The NSF check, in IRD form, returned to the automobile dealer will be returned by the dealer's bank. The bank is considered trustworthy. The IRD is presumed valid, based on table 75 and the trustworthy status of the bank.

Figure 12:
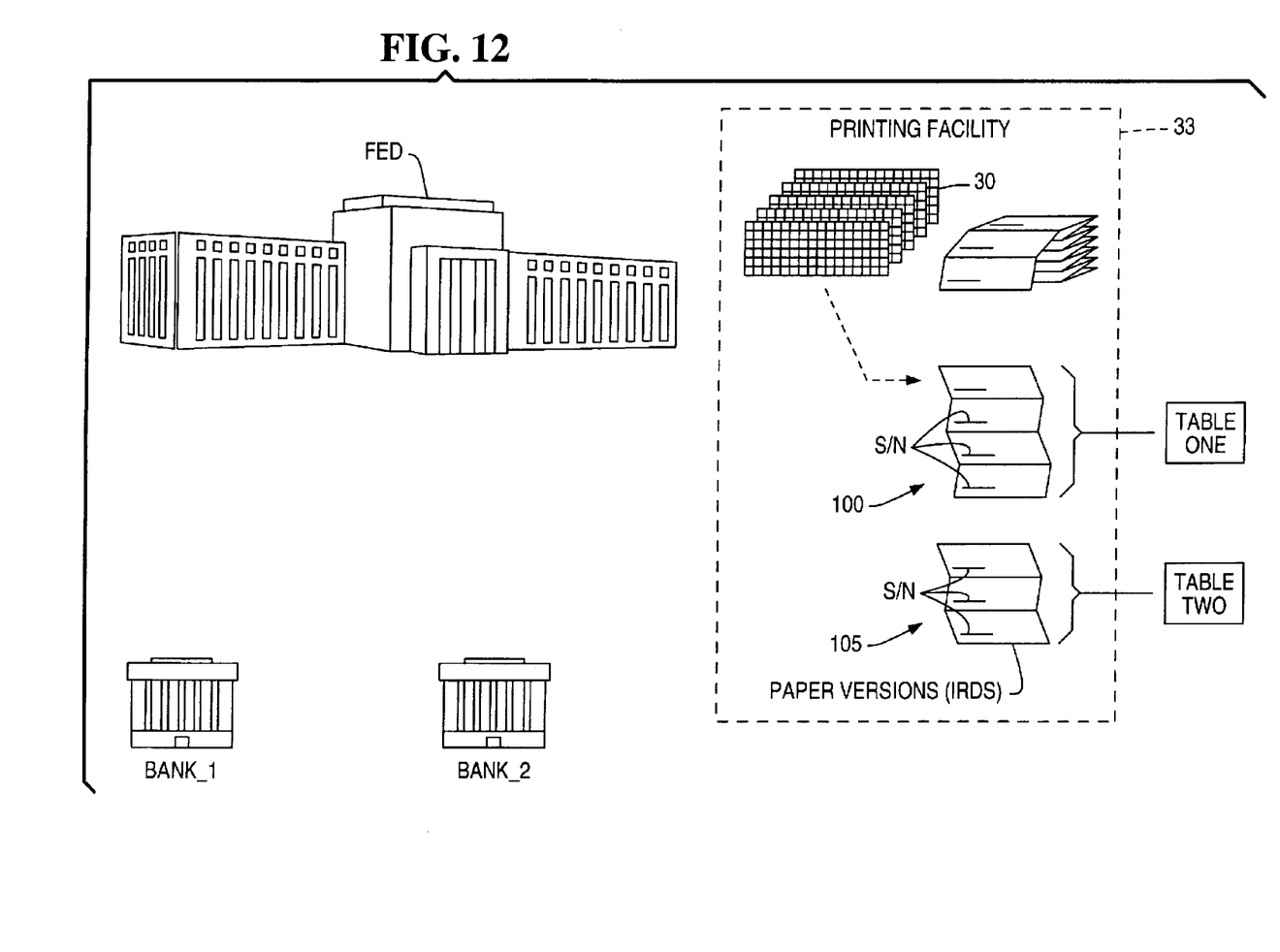

In another embodiment, subsets of the data contained in table 75 can be delivered to drawee banks. For example, as shown in FIG. 12, when the printing facility 33 prints IRDs, as for banks which are not equipped to handle digitized checks, the printing facility 33 also collects the entries corresponding to those checks from table 75. In this example, two groups 100 and 105 of printed checks are shown. Entries are collected into TABLE 1 for the former, and TABLE 2 for the latter.

Figure 13:
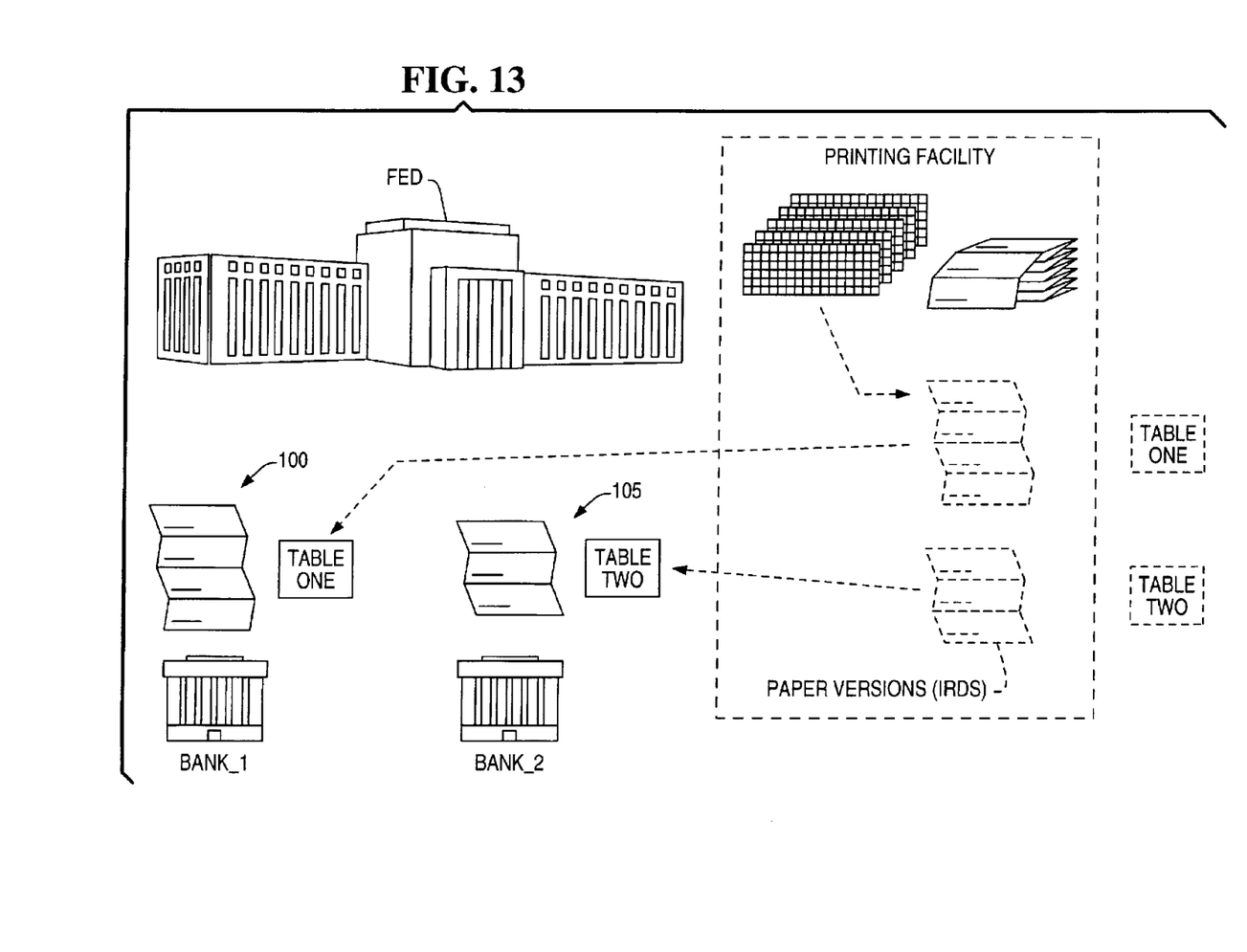

The clearing system FED then delivers the paper IRDs 100 and 105 to the drawee-banks, as indicated in FIG. 13, together with the TABLES 1 and 2. Preferably, the TABLES are delivered prior to the IRDs.

Under this approach, BANK_1 and BANK_2 can then compare each IRD with the corresponding TABLE, to see whether the each IRD corresponds to a check listed in the TABLE. If a discrepancy is found, then a check is seen as suspect.

These tables can also be delivered whenever IRDs are printed.

The Inventor points out that the data in the tables is generated at the time the IRDs are printed, and thus represent a historical record of some, or all, of the information printed on each respective IRD.

The Inventor points out that one function performed by the TABLES shown in FIGS. 10–12 is to answer the following type of question: "Is this IRD genuine ?" Or, more specifically, "Does the data on the IRD in my possession correspond to that in the TABLE for the same serial number ?".

An invention has been described wherein paper checks are digitized in a check-clearing system. The paper checks are placed into storage, and the digitized checks are returned to the drawee-banks instead of paper checks, or "cleared." When paper checks are needed, they are printed from the digitized checks, each with a unique serial number. These print-outs are called IRDs. They can be printed on check stock, and the stock may be pre-numbered with the serial numbers.

In addition, a table may be generated, which contains the serial number of each IRD, as well as all, or some, of the data printed on the IRD. A holder of the IRD may consult the table, to verify that the serial number, and all other data on the check, correspond to that in the table.

Of course, eventually the table will become quite large, containing billions of entries, or more. Thus, over time, old entries in the table may be shunted into a second table. Any party wishing to search for a check will first search the smaller table for "new" checks. If the check is not found, then the second table is searched. This can save search time.

In one form of the invention, each bank involved is assigned a group of unique serial numbers. For example, bank A can be assigned numbers A1 through A1,000. Bank B may be assigned numbers B1 through B1,000. In the general case, the serial number can contain two parts: (1) a serial number and (2) a bank identifier. The serial numbers for different banks can overlap, and thus be similar, but the bank identifier would distinguish the two numbers. The numbers A55 and B55 provide two examples. The numbers (55) are the same, but the bank identifiers (A and B) are different.

Numerous substitutions and modifications can be undertaken without departing from the true spirit and scope of the invention. What is desired to be secured by Letters Patent is the invention as defined in the following claims.

What is claimed is:

1. A method, comprising:
   a) distributing digitized versions of bank checks to banks in a check-clearing process;
   b) using some of the digitized versions to print paper versions of bank checks;
   c) delivering the paper versions to recipients; and
   d) in response to requests from recipients or transferees of recipients, providing access to a database which stores information printed on the paper versions to allow verification of content of the paper versions for any of the recipients or transferees of recipients.

2. Method according to claim 1, wherein data from files which store information printed on the paper versions are transmitted to recipients when the database is accessed.

3. Method according to claim 2, further comprising:

e) printing a serial number on all paper versions.

4. Method according to claim 3, wherein no two serial numbers are alike.

5. A method of operating a clearing system for bank checks, comprising:
   a) digitizing bank checks, drawn on multiple banks, into respective digital counterparts;
   b) generating a database containing selected information from each check; and
   c) distributing the digitized checks to banks on which the checks are drawn;
   d) generating paper versions of selected checks based on the their digital counterparts, all paper versions having unique serial numbers; and
   e) sending the paper versions to recipients.

6. Method according to claim 5, further comprising:
   f) making data available from the database to a recipient, thereby allowing the recipient to ascertain validity of a paper version.

7. A method comprising:
   a) maintaining a check-clearing system which collects paper bank checks after initial deposit, each paper bank check being drawn on a drawee-bank,
   b) for each paper check collected, creating a data version from which an accurate representation of the paper check is recoverable;
   c) placing the paper checks into storage;
   d) sending the data versions to respective drawee-banks;
   e) using some of the data versions,
      i) recovering accurate paper representations of the corresponding paper checks;
      ii) causing each paper representation to bear a unique serial number, wherein no two serial numbers are alike;
      iii) sending the recovered paper representations to recipients, some of which comprises drawee banks of the respective checks; and
   f) storing selected information contained in the paper representations into a database.

8. Method according to claim 6, further comprising:
   g) making access to information stored in the database available for the recipients of the recovered paper representations.

9. Method according to claim 8, wherein access to the information in the database relating to a check is made available for a recipient of the corresponding paper representation of the check, to allow verification of content of the paper representation of the check.

10. Method according to claim 7, further comprising:
    g) sending the information selected from a check to the recipient of the recovered paper representation of the check.

11. Method according to claim 10, wherein the selected information is transmitted to the recipient prior to sending the paper representations.

12. In a system wherein a check clearing system (A) collects deposited bank checks, (B) creates digital images of collected checks, and (C) distributes the digital images to banks, a method comprising:
    a) generating a paper representation of a check from its corresponding digital image, and sending the paper representation of the check to a requesting party;
    b) maintaining in a database a record of information printed on the paper representation of the check; and
    c) transmitting the information for the party to allow verification of content of the paper representation of the check when the party identifies a serial number printed on the paper representation of the check.

13. Method according to claim 12, wherein the serial number printed on the paper representation of the check is unique.

14. In a check-clearing system, the improvement comprising:
    a) digitizing paper checks into digitized versions;
    b) printing some paper representations of the checks from the corresponding digitized versions;
    c) storing in a database information printed onto the paper representations; and
    d) making the database available for holders of the paper representations to allow the paper representations to be verified.

* * * * *

UNITED STATES PATENT AND TRADEMARK OFFICE
CERTIFICATE OF CORRECTION

PATENT NO. : 6,860,423 B2
DATED : March 1, 2005
INVENTOR(S) : Kallin, F.

It is certified that error appears in the above-identified patent and that said Letters Patent is hereby corrected as shown below:

Column 7,
Line 16, after ";", delete "and".
Line 20, before "their", delete "the".

Signed and Sealed this

Fifteenth Day of November, 2005

JON W. DUDAS
*Director of the United States Patent and Trademark Office*